US012384258B2

United States Patent
Kim et al.

(10) Patent No.: US 12,384,258 B2
(45) Date of Patent: Aug. 12, 2025

(54) WIRELESS CHARGING APPARATUS AND TRANSPORTATION MEANS INCLUDING SAME

(71) Applicant: SKC CO., LTD., Gyeonggi-do (KR)

(72) Inventors: Tae Kyoung Kim, Gyeonggi-do (KR); Jong Hak Choi, Gyeonggi-do (KR); Nah Young Kim, Gyeonggi-do (KR); Seunghwan Lee, Gyeonggi-do (KR)

(73) Assignee: SKC CO., LTD., Gyeonggi-do (KR)

( * ) Notice: Subject to any disclaimer, the term of this patent is extended or adjusted under 35 U.S.C. 154(b) by 756 days.

(21) Appl. No.: 17/775,191

(22) PCT Filed: Jan. 27, 2021

(86) PCT No.: PCT/KR2021/001083
§ 371 (c)(1),
(2) Date: May 6, 2022

(87) PCT Pub. No.: WO2021/153985
PCT Pub. Date: Aug. 5, 2021

(65) Prior Publication Data
US 2022/0402377 A1 Dec. 22, 2022

(30) Foreign Application Priority Data
Jan. 28, 2020 (KR) .................. 10-2020-0009932

(51) Int. Cl.
*H02J 50/10* (2016.01)
*B60L 53/12* (2019.01)
(Continued)

(52) U.S. Cl.
CPC ............ *B60L 53/12* (2019.02); *H01F 27/255* (2013.01); *H01F 27/2823* (2013.01);
(Continued)

(58) Field of Classification Search
USPC ................. 320/105, 106, 107, 108, 109, 110
See application file for complete search history.

(56) References Cited

U.S. PATENT DOCUMENTS

| 2011/0018498 A1* | 1/2011 | Soar ........................ H01F 27/36 320/108 |
| 2014/0002228 A1 | 1/2014 | Hatanaka et al. |

FOREIGN PATENT DOCUMENTS

| CN | 108429352 A * | 8/2018 | ........... G06F 1/1626 |
| JP | 2015-012658 A | 1/2015 | |

(Continued)

OTHER PUBLICATIONS

Office Action for the Japanese Patent Application No. 2022-528934 issued by the Japanese Patent Office on Nov. 28, 2023.

(Continued)

*Primary Examiner* — Brian Ngo
(74) *Attorney, Agent, or Firm* — IP & T GROUP LLP (57) ABSTRACT

A wireless charging apparatus according to an embodiment can improve heat dissipation and charging efficiency by adjusting the surface area of a magnetic pad. Therefore, the wireless charging apparatus can be effectively used for a transportation means, such as an electric vehicle, which requires high-capacity power transmission between a transmitter and a receiver.

10 Claims, 5 Drawing Sheets

(51) Int. Cl.
   *H01F 27/255*   (2006.01)
   *H01F 27/28*    (2006.01)
   *H02J 50/00*    (2016.01)
   *H02J 50/70*    (2016.01)
(52) U.S. Cl.
   CPC ........ *H01F 27/2885* (2013.01); *H02J 50/005* (2020.01); *H02J 50/10* (2016.02); *H02J 50/70* (2016.02)

(56) References Cited

FOREIGN PATENT DOCUMENTS

| | | |
|---|---|---|
| JP | 2016139694 A | 8/2016 |
| JP | 2017-200334 A | 11/2017 |
| JP | 2019-201451 A | 11/2019 |
| KR | 10-2011-0042403 A | 4/2011 |
| KR | 10-1810001 B1 | 12/2017 |
| KR | 10-2018-0027013 A | 3/2018 |
| KR | 20190123000 A | 10/2019 |
| WO | 2012/073427 A1 | 6/2012 |
| WO | 2014/061082 A1 | 4/2014 |

OTHER PUBLICATIONS

Office Action for the Japanese Patent Application No. 2022-528934 issued by the Japanese Patent Office on May 16, 2023.
Extended European Search Report for the European Patent Application No. 21748052.4 issued by the European Patent Office on Jan. 22, 2024.

\* cited by examiner

WIRELESS CHARGING APPARATUS AND TRANSPORTATION MEANS INCLUDING SAME

This application is a national stage application of PCT/KR2021/001083 filed on Jan. 27, 2021 which claims priority of Korean patent application number 10-2020-0009932 filed on Jan. 28, 2020. The disclosure of each of the foregoing application is incorporated herein by reference in its entirety.

TECHNICAL FIELD

Embodiments relate to a wireless charging device and to a transportation means comprising the same. More specifically, the embodiments relate to a wireless charging device with enhanced charging efficiency through a heat dissipation structure and to a transportation means comprising the same such as an electric vehicle.

BACKGROUND ART

In recent years, the information and communication field is being developed at a very fast pace, and various technologies that comprehensively combine electricity, electronics, communication, and semiconductor are continuously being developed. In addition, as electronic devices tend to be more mobile, research on wireless communication and wireless power transmission technologies is being actively conducted in the communication field. In particular, research on a method for wirelessly transmitting power to electronic devices is being actively conducted.

The wireless power transmission refers to wirelessly transmitting power through space using inductive coupling, capacitive coupling, or an electromagnetic field resonance structure such as an antenna without physical contact between a transmitter that supplies power and a receiver that receives power. The wireless power transmission is suitable for portable communication devices, electric vehicles, and the like that require a large-capacity battery. Since the contacts are not exposed, there is little risk of a short circuit, and a charging failure phenomenon in a wired method can be prevented.

Meanwhile, as interest in electric vehicles has rapidly increased in recent years, interest in building charging infrastructure is increasing. Various charging methods have already appeared, such as electric vehicle charging using home chargers, battery replacement, rapid charging devices, and wireless charging devices. A new charging business model has also begun to appear (see Korean Laid-open Patent Publication No. 2011-0042403). In addition, electric vehicles and charging stations that are being tested begin to stand out in Europe. In Japan, electric vehicles and charging stations are being piloted, led by automakers and power companies.

PRIOR ART DOCUMENT (Patent Document 1) Korean Laid-open Patent Publication No. 2011-0042403

DISCLOSURE OF INVENTION

Technical Problem

Figure 6:
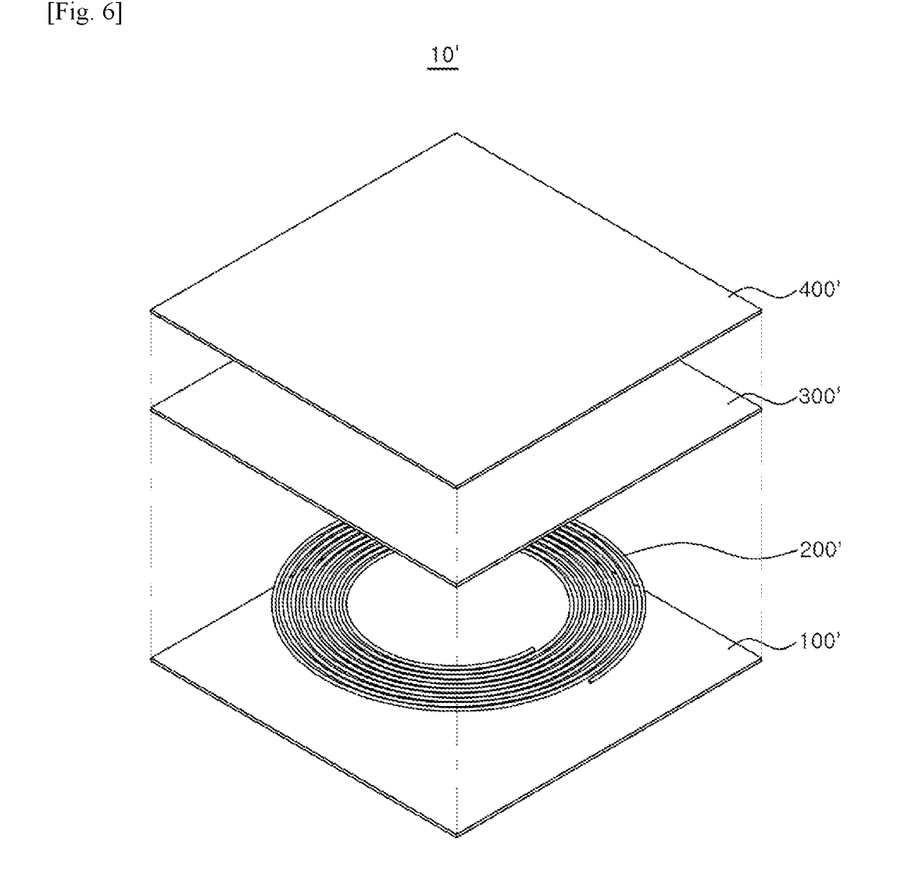
FIG. 6 is an exploded perspective view of a conventional wireless charging device.

In the conventional wireless charging device used for a transportation means such as electric vehicles, referring to FIG. 6, a magnetic pad (300') is disposed adjacent to a coil (200') to enhance the wireless charging efficiency, and a shield unit (400') for electromagnetic shielding is disposed to be spaced apart from the magnetic pad (300') by a predetermined interval.

A wireless charging device generates heat due to the resistance of a coil and the magnetic loss of a magnetic pad during the wireless charging operation. In particular, the magnetic pad in a wireless charging device generates heat in a part close to the coil with a high electromagnetic wave energy density. The generated heat may change the magnetic characteristics of the magnetic pad and cause an impedance mismatch between the transmitting pad and the receiving pad, which deteriorates the charging efficiency. As a result, the generation of heat is, in turn, aggravated. However, since such a wireless charging device is mainly installed in the lower part of a transportation means such as an electric vehicle, a sealed structure is adopted for dustproofing, waterproofing, and shock absorption. Thus, it is difficult to implement a heat dissipation structure.

As a result of research conducted by the present inventors, it has been discovered that the surface area of a magnetic pad used in a wireless charging device may be adjusted to enhance the heat dissipation and charging efficiency.

Accordingly, the problem to be solved by the embodiment is to provide a wireless charging device with improved heat dissipation and charging efficiency and a transportation means comprising the same.

Solution to Problem

According to an embodiment, there is provided a wireless charging device, which comprises a coil comprising a conductive wire; a shield unit disposed on the coil; and a magnetic pad disposed between the coil and the shield unit, wherein the magnetic pad satisfies the following Relationship (1).

$$S_{TOT}/C_{MAX} \geq 2.5 \tag{1}$$

In the above relationship, $C_{MAX}$ is the maximum cross-sectional area among cross-sectional areas that can be derived when the magnetic pad is cut in the horizontal direction, and $S_{TOT}$ is the total surface area of the magnetic pad.

According to another embodiment, there is provided a transportation means comprising the wireless charging device according to an embodiment.

Advantageous Effects of Invention

According to the above embodiment, as the surface area of a magnetic pad used in a wireless charging device is adjusted, it is possible to enhance the heat dissipation and charging efficiency.

According to a specific embodiment, the magnetic pad is formed to have a three-dimensional structure on its surface rather than a flat sheet structure, so that it has a larger surface area than that of a typical magnetic pad, whereby heat can be readily dissipated.

Accordingly, the wireless charging device can be advantageously used in a transportation means such as electric vehicles that requires large-capacity power transmission between a transmitter and a receiver.

EXPLANATION OF REFERENCE NUMERALS

| | |
|---|---|
| 1: transportation means | 2: injection molding machine |
| 3: mold | 301: raw material composition |
| 10: wireless charging device according to an embodiment | |
| 10': wireless charging device of the prior art | |
| 21: receiver | 22: transmitter |
| 100, 100': support unit | 200, 200': coil |
| 300, 300': magnetic pad | 310: unit area |
| 400, 400': shield unit | 600: housing |
| c1-1, c2-1: first cross-section | c1-2, c2-2: second cross-section |
| c1-3, c2-3: third cross-section | m: length of the side of the unit area |

BEST MODE FOR CARRYING OUT THE INVENTION

In the following description of the embodiments, in the case where an element is mentioned to be formed "on" or "under" another element, it means not only that one element is directly formed "on" or "under" another element, but also that one element is indirectly formed on or under another element with other element(s) interposed between them. In addition, it should be understood that the criteria for the on and under of each component may vary depending on the direction in which the object is observed. For the sake of description, the sizes of individual elements in the appended drawings may be exaggeratedly depicted or omitted, and they may differ from the actual sizes.

Throughout the present specification, when a part is referred to as "comprising" an element, it is understood that other elements may be comprised, rather than other elements are excluded, unless specifically stated otherwise.

In addition, all numbers expressing the characteristics, dimensions, and the like of elements used herein are to be understood as being modified by the term "about" unless otherwise indicated.

In the present specification, a singular expression is understood to encompass a singular or plural expression, interpreted in context, unless otherwise specified.

Wireless Charging Device

Figure 1:
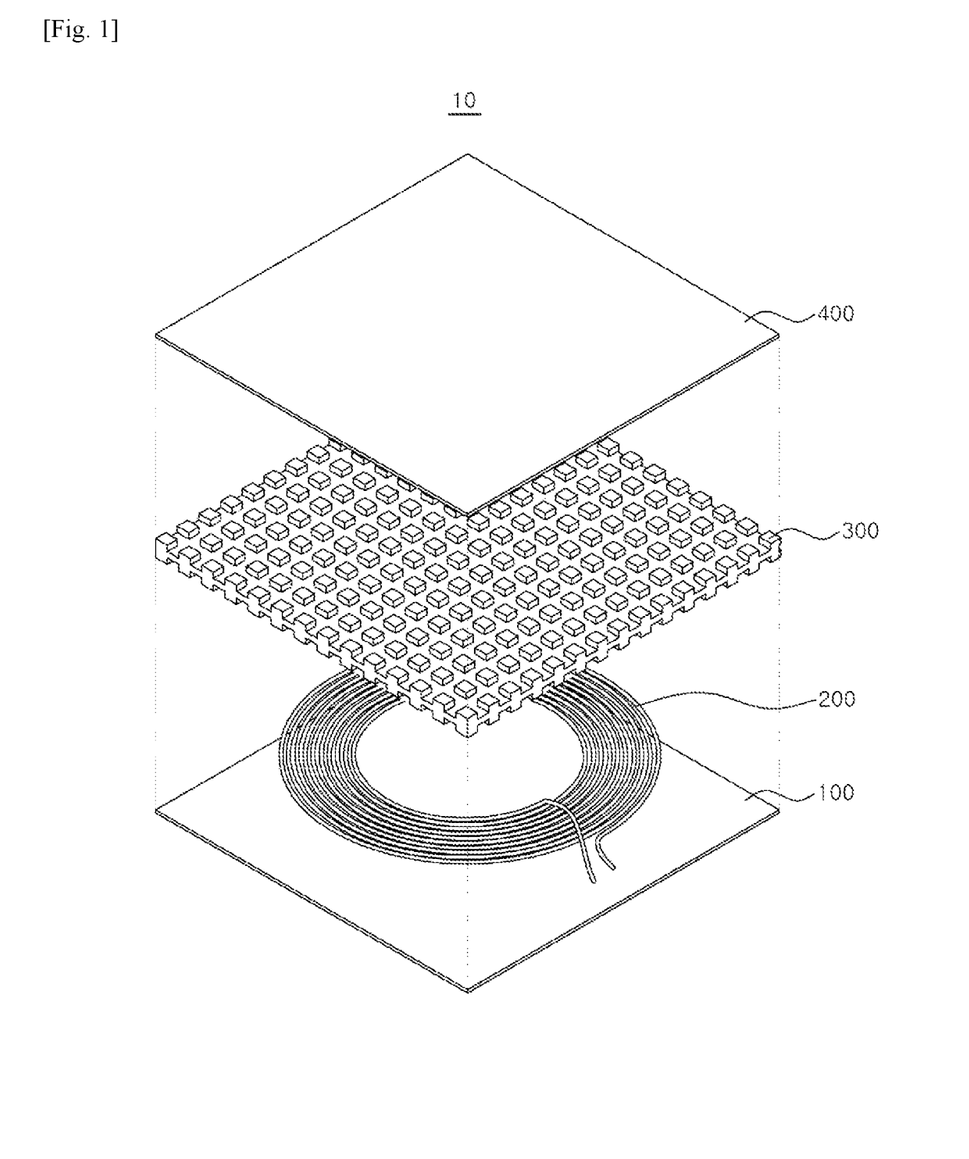
FIG. 1 is an exploded perspective view of a wireless charging device according to an embodiment.

FIG. 1 is an exploded perspective view of a wireless charging device according to an embodiment.

Referring to FIG. 1, the wireless charging device (10) according to an embodiment comprises a coil (200) comprising a conductive wire; a shield unit (400) disposed on the coil (200); and a magnetic pad (300) disposed between the coil (200) and the shield unit (400).

In the wireless charging device according to an embodiment, as the surface area of the magnetic pad is adjusted, it is possible to enhance the heat dissipation and charging efficiency.

According to a specific embodiment, the magnetic pad is formed to have a three-dimensional structure on its surface rather than a flat sheet structure, so that it has a larger surface area than that of a magnetic pad having common dimensional specifications, whereby heat can be readily dissipated.

Accordingly, the wireless charging device can be advantageously used in a transportation means such as electric vehicles that requires large-capacity power transmission between a transmitter and a receiver.

Hereinafter, each constitutional element of the wireless charging device will be described in detail.

Coil

The coil comprises a conductive wire.

The conductive wire comprises a conductive material. For example, the conductive wire may comprise a conductive metal. Specifically, the conductive wire may comprise at least one metal selected from the group consisting of copper, nickel, gold, silver, zinc, and tin.

In addition, the conductive wire may have an insulating sheath. For example, the insulating sheath may comprise an insulating polymer resin. Specifically, the insulating sheath may comprise a polyvinyl chloride (PVC) resin, a polyethylene (PE) resin, a Teflon resin, a silicone resin, a polyurethane resin, or the like.

The conductive wire may have a diameter of, for example, 1 mm to 10 mm, 1 mm to 5 mm, or 1 mm to 3 mm.

The conductive wire is wound in the form of a planar coil. Specifically, the planar coil may comprise a planar spiral coil. Here, the shape of the planar coil may be an ellipse, a polygon, or a polygonal shape with rounded corners, but it is not particularly limited thereto.

The planar coil may have an outer diameter of 5 cm to 100 cm, 10 cm to 50 cm, 10 cm to 30 cm, 20 cm to 80 cm, or 50 cm to 100 cm. As a specific example, the planar coil may have an outer diameter of 10 cm to 50 cm.

In addition, the planar coil may have an inner diameter of 0.5 cm to 30 cm, 1 cm to 20 cm, or 2 cm to 15 cm.

The number of turns of the planar coil may be 5 to 50 times, 10 to 30 times, 5 to 30 times, 15 to 50 times, or 20 to 50 times. As a specific example, the planar coil may be formed by winding the conductive wire 10 to 30 times.

In addition, the distance between the conductive wires in the planar coil shape may be 0.1 cm to 1 cm, 0.1 cm to 0.5 cm, or 0.5 cm to 1 cm.

Within the preferred dimensions and specification ranges of the planar coil as described above, it can be appropriately used in the fields such as electric vehicles that require large-capacity power transmission.

Shield Unit

The shield unit is disposed on the coil.

The shield unit suppresses electromagnetic interference (EMI) that may be generated by leakage of electromagnetic waves to the outside through electromagnetic shielding.

The material of the shield unit may be, for example, a metal. Thus, the shield unit may be a metal plate, but it is not particularly limited thereto.

As a specific example, the material of the shield unit may be aluminum. Other metals or alloy materials having an electromagnetic wave shielding ability may be used.

The shield unit may have a thickness of 0.2 mm to 10 mm, 0.5 mm to 5 mm, or 1 mm to 3 mm.

In addition, the shield unit may have an area of 200 $cm^2$ or more, 400 $cm^2$ or more, or 600 $cm^2$ or more.

Magnetic Pad

In the present specification, a magnetic pad refers to a magnetic material having a pad shape. As it is naturally understood from the term pad, it refers to a magnetic material having a flat or plane shape as a whole. Thus, the magnetic pad may have a shape in which the size in the vertical direction is smaller than the size in the horizontal direction. From the above point of view, a magnetic material having an isotropic shape, such as a sphere or a cube, or having a size in the horizontal direction similar to that in the vertical direction does not fall under the category of the magnetic pad described herein. In addition, the magnetic pad may have curves or irregularities on at least one side thereof, while it may have a polyhedral shape such as a cuboid as a whole.

The magnetic pad is disposed between the coil and the shield unit.

The magnetic pad may be disposed to be spaced apart from the shield unit by a predetermined interval. For example, the spaced distance between the magnetic pad and the shield unit may be 3 mm or more, 5 mm or more, 3 mm to 10 mm, or 4 mm to 7 mm.

In addition, the magnetic pad may be disposed to be spaced apart from the coil by a predetermined interval. For example, the spaced distance between the magnetic pad and the coil may be 0.2 mm or more, 0.5 mm or more, 0.2 mm to 3 mm, or 0.5 mm to 1.5 mm.

Composition of the Magnetic Pad

The magnetic pad may comprise a binder resin and a magnetic powder dispersed in the binder resin. As a result, since the magnetic powder is coupled with each other by the binder resin, the magnetic pad may have fewer defects over a large area and less damage caused by an impact.

The magnetic powder may be an oxide magnetic powder such as ferrite (Ni—Zn-based, Mg—Zn-based, Mn—Zn-based ferrite, and the like); a metallic magnetic powder such as permalloy, sendust, and nanocrystalline magnetic materials; or a mixed powder thereof. More specifically, the magnetic powder may be sendust particles having a Fe—Si—Al alloy composition.

As an example, the magnetic powder may have a composition of the following Formula 1.

$$Fe_{1-a-b-c}Si_aX_bY_c \qquad \text{[Formula 1]}$$

In the above formula, X is Al, Cr, Ni, Cu, or a combination thereof; Y is Mn, B, Co, Mo, or a combination thereof; $0.01 \leq a \leq 0.2$, $0.01 \leq b \leq 0.1$, and $0 \leq c \leq 0.05$.

The magnetic powder may have an average particle diameter in the range of 3 nm to 1 mm, 1 μm to 300 μm, 1 μm to 50 μm, or 1 μm to 10 μm.

The magnetic pad may comprise the magnetic powder in an amount of 50% by weight or more, 70% by weight or more, or 85% by weight or more. For example, the magnetic pad may comprise the magnetic powder in an amount of 50% by weight to 99% by weight, 70% by weight to 95% by weight, 70% by weight to 90% by weight, 75% by weight to 90% by weight, 75% by weight to 95% by weight, 80% by weight to 95% by weight, or 80% by weight to 90% by weight.

The binder resin may be a curable resin. Specifically, it may be a photocurable resin or a thermosetting resin. Alternatively, the binder resin may comprise a high heat-resistant thermoplastic resin.

A resin, which comprises at least one functional group or moiety that can be cured by heat such as a glycidyl group, an isocyanate group, a hydroxyl group, a carboxyl group, or an amide group; or at least one functional group or moiety that can be cured by active energy such as an epoxide group, a cyclic ether group, a sulfide group, an acetal group, or a lactone group, may be used as the above resin that can be cured to exhibit adhesiveness. Such a functional group or moiety may be, for example, an isocyanate group (—NCO), a hydroxyl group (—OH), or a carboxyl group (—COOH).

Specifically, examples of the curable resin include a polyurethane resin, an acrylic resin, a polyester resin, an isocyanate resin, or an epoxy resin having at least one functional group or moiety as described above, but it is not limited thereto.

As an example, the binder resin may comprise a polyurethane-based resin, an isocyanate-based curing agent, and an epoxy-based resin.

The magnetic pad may comprise the binder resin in an amount of 5% by weight to 40% by weight, 5% by weight to 20% by weight, 5% by weight to 15% by weight, or 7% by weight to 15% by weight.

In addition, the magnetic pad may comprise, based on the weight thereof, 6% by weight to 12% by weight of a polyurethane-based resin, 0.5% by weight to 2% by weight of an isocyanate-based curing agent, and 0.3% by weight to 1.5% by weight of an epoxy-based resin, as the binder resin.

Surface Area of the Magnetic Pad

According to the embodiment, the magnetic pad satisfies the following Relationship (1).

$$S_{TOT}/C_{MAX} \geq 2.5 \qquad (1)$$

In the above relationship, $C_{MAX}$ is the maximum cross-sectional area among cross-sectional areas that can be derived when the magnetic pad is cut in the horizontal direction, and $S_{TOT}$ is the theoretical total surface area of the magnetic pad.

If the magnetic pad satisfies Relationship (1), heat generated in the magnetic pad during wireless charging may be more effectively dissipated.

Specifically, the $S_{TOT}/C_{MAX}$ value may be 2.5 or more, 2.7 or more, 3.0 or more, 5.0 or more, or 10.0 or more. Meanwhile, the upper limit of the range of the $S_{TOT}/C_{MAX}$ value is not particularly limited, but it may be, for example, 20.0 or less, 15.0 or less, 10.0 or less, 5.0 or less, or 3.0 or less.

Figure 2A:
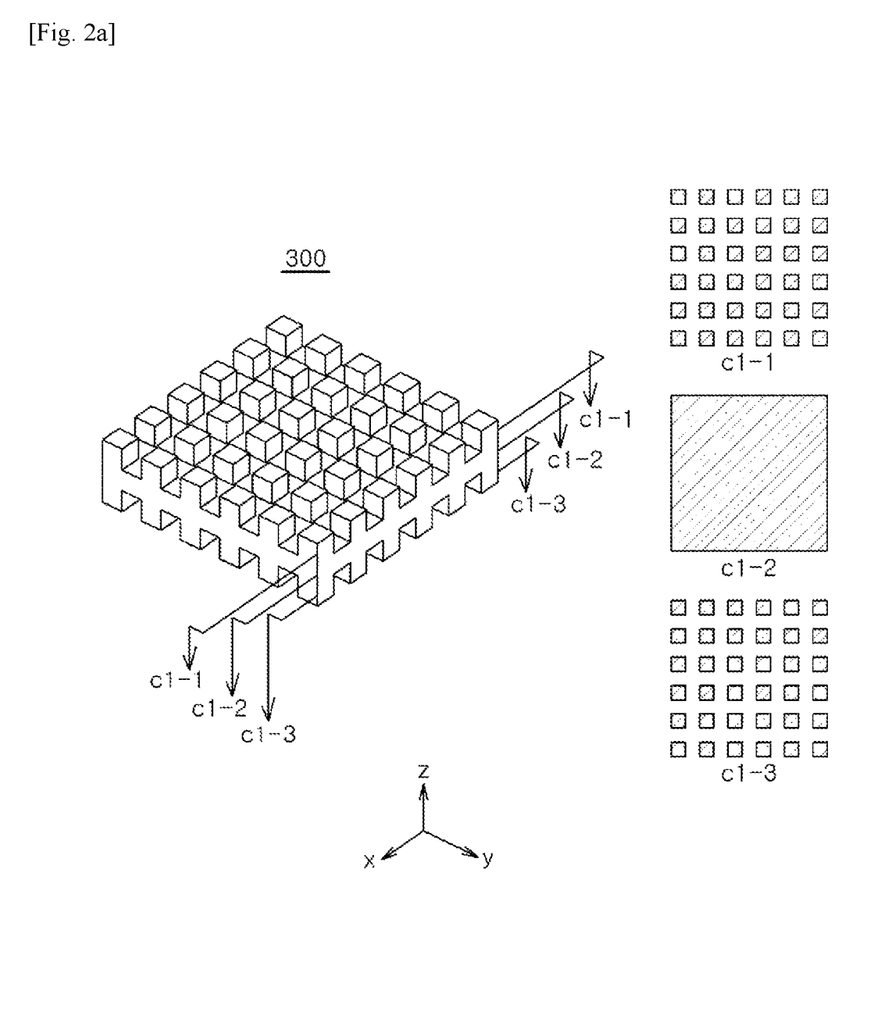
FIGS. 2a and 2b each show a magnetic pad according to an embodiment and a cross-section thereof.
Figure 2B:
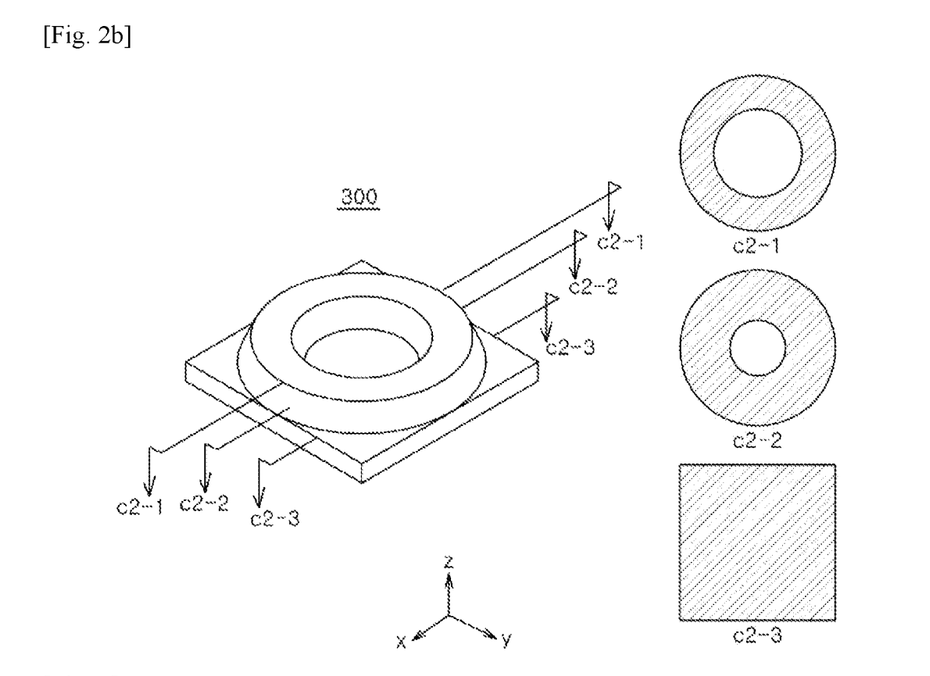

In Relationship (1), $C_{MAX}$ is the maximum cross-sectional area among cross-sectional areas that can be derived when the magnetic pad is cut in the horizontal direction. As an example, as shown in FIGS. 2a and 2b, once the areas (i.e., cross-sectional areas) of several cross-sections, that is, first cross-sections (c1-1, c2-1), second cross-sections (c1-2, c2-2), and third cross-sections (c1-3, c2-3) have been obtained by cutting the magnetic pad (300) in the horizontal direction, $C_{MAX}$ is determined as the largest area among them. That is, in FIG. 2a, $C_{MAX}$ is the area of the second cross-section (c1-2), and in FIG. 2b, $C_{MAX}$ is the area of the third cross-section (c2-3). Here, the cross-sectional area may be mathematically calculated using the edge length or diameter of the figures constituting the cross-section or derived as a theoretical value through integration. Alternatively, it may be actually measured using a measuring device. In addition, $C_{MAX}$ may be obtained by theoretical mathematical calculations from the shape of the magnetic pad without actually cutting the magnetic pad. Auxiliary means such as computer-aided design (CAD) may be used for this purpose.

In addition, the horizontal direction of the magnetic pad refers to the direction parallel to the plane direction (X-axis and Y-axis) of the magnetic pad. In other words, it refers to the direction perpendicular to the height or thickness direction (Z axis) of the magnetic pad.

In Relationship (1), $S_{TOT}$ is the total surface area of the magnetic pad. For example, it may be a theoretical total surface area obtained by summing the surface areas of all surfaces calculated using lengths of the corners constituting the three-dimensional shape of the magnetic pad. The theoretical total surface area may be obtained by measuring the length of the corners present in the magnetic pad, calculating the surface area of all surfaces constituting the magnetic pad in consideration of the height and diameter of the three-dimensional shape composed of the corners, and summing all of them. Since the magnetic pad according to an embodiment is assumed to have a regular or reproducible shape, the theoretical total surface area can be calculated without difficulties. If necessary, it may be calculated using auxiliary means such as CAD.

The theoretical total surface area of the magnetic pad calculated in this way may be approximately equal to the surface area obtained by a well-known surface area measurement method (BET method or the like). Even some deviations are not expected to depart from the objectives desired in the above embodiments. For example, irregular or fine curves and irregularities may be present on the surface of the magnetic pad. As a result, the actual total surface area of the magnetic pad may be greater than the theoretical total surface area. However, the purpose desired in the wireless charging device according to the embodiment can be sufficiently accomplished even by applying a theoretical value to Relationship (1). Thus, it is not necessary to take into account even irregular or fine curves and irregularities present on the surface of the magnetic pad.

The magnetic pad adopted in the wireless charging device according to an embodiment has a larger surface area than that of a magnetic pad having common dimensional specifications, whereby heat can be readily dissipated.

The magnetic pad may have a three-dimensional structure rather than a planar structure. For example, the magnetic pad may be formed to have irregularities on its surface. The irregularities may be formed in a regular pattern. As an example, as shown in FIGS. 1 and 2a, the surface of the magnetic pad (300) may have a shape in which cuboid-shaped protrusions are regularly arranged.

If the magnetic pad has a plurality of protrusions on at least one side thereof, the sum of the surface areas of the plurality of protrusions may be 0.5 times or more of $C_{MAX}$ of the magnetic pad. Specifically, the sum of the surface areas of the plurality of protrusions may be greater than $C_{MAX}$ of the magnetic pad. More specifically, the sum of the surface areas of the plurality of protrusions may be 1.1 times or more, 1.5 times or more, or 2 times or more, of $C_{MAX}$ of the magnetic pad. In addition, the surface area of the side having the plurality of protrusions (i.e., the sum of the surface areas of the plurality of protrusions on the surface and the total area of the surface on which the protrusions are not formed) may be 1.2 times or more of $C_{MAX}$ of the magnetic pad.

The protrusions may have a height of 0.1 mm or more, 0.5 mm or more, or 1 mm or more. In addition, the protrusions may have a height of 10 mm or less, 5 mm or less, or 3 mm or less. Specifically, the protrusions may have a height of 0.1 mm to 5 mm or 0.5 mm to 3 mm. In addition, the planar shape of the protrusions may be a polyhedral shape comprising a quadrangle or a circular shape comprising an ellipse. The length of one side of the polyhedral shape or the diameter of the circle may be 0.1 mm or more, 0.5 mm or more, or 1 mm or more and may be 10 mm or less, 5 mm or less, or 3 mm or less, specifically, 0.1 mm to 5 mm, or 0.5 mm to 3 mm.

Here, the magnetic pad comprising the protrusions may have a thickness of 1 mm or more, 2 mm or more, 3 mm or more, or 4 mm or more. In addition, the magnetic pad comprising the protrusions may have a thickness of 20 mm or less, 10 mm or less, or 5 mm or less. Specifically, the magnetic pad comprising the protrusions may have a thickness of 1 mm to 20 mm or 2 mm to 10 mm.

In addition, the magnetic pad may have a curved surface. The curve may be a gentle or steep curve, and a plurality of curves may be formed.

In addition, the magnetic pad may further satisfy the following Relationship (2).

$$(S_{top}+S_{bottom})/C_{MAX} \geq 2.2 \quad (2)$$

In the above relationship, $C_{MAX}$ is the maximum cross-sectional area among cross-sectional areas that can be derived when the magnetic pad is cut in the horizontal direction, and $S_{top}$ and $S_{bottom}$ are each the surface area of the upper side and lower side of the magnetic pad.

If the magnetic pad satisfies Relationship (2), heat generated in the magnetic pad during wireless charging may be more effectively dissipated.

Specifically, the $(S_{top}+S_{bottom})/C_{MAX}$ value may be 2.2 or more, 2.5 or more, 2.7 or more, 3.0 or more, or 5.0 or more. Meanwhile, the upper limit of the range of the $(S_{top}+S_{bottom})/C_{MAX}$ value is not particularly limited, but it may be, for example, 15.0 or less, 10.0 or less, 5.0 or less, or 3.0 or less.

The description on $C_{MAX}$ in Relationship (2) is as described on $C_{MAX}$ in Relationship (1) above.

In Relationship (2), $S_{top}$ is the surface area of the upper side of the magnetic pad. Here, the upper side of the magnetic pad refers to a side present in the upper part of the flat pad. As an example, it may refer to a side formed above a cross-section having the maximum cross-sectional area in the magnetic pad. Similarly, $S_{bottom}$ in Relationship (2) is the surface area of the lower side of the magnetic pad, that is, a side present in the lower part of the magnetic pad.

The surface areas of the upper side and lower side of the magnetic pad may be obtained by theoretical calculation or actual measurement as in the method of obtaining $S_{TOT}$ in Relationship (1) above. In addition, the magnetic pad may have a plurality of protrusions or curves on at least one side as exemplified above. In such a case, the surface areas of the upper side and lower side of the magnetic pad may be obtained as they encompass the surface areas of the plurality of protrusions or curves.

Figure 3:
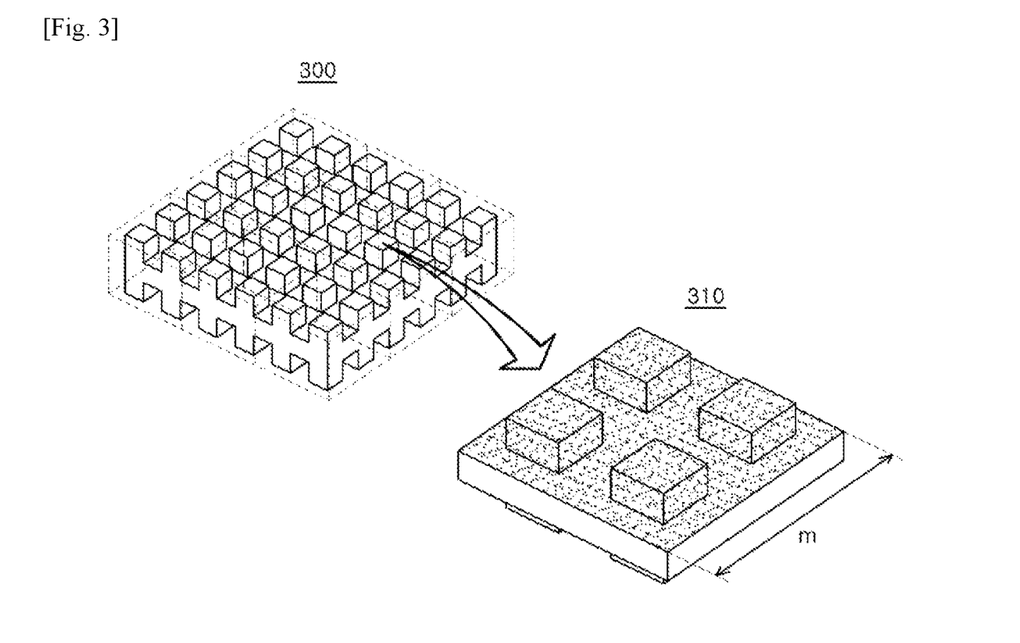
FIG. 3 shows a magnetic pad according to an embodiment and a unit area thereof.

In addition, as shown in FIG. 3, when the magnetic pad (300) is divided into lattices in the horizontal direction as unit regions having specific dimensions, the surface area of the upper side or the lower side of at least one unit region (310) of the magnetic pad may be equal to, or greater than, a predetermined area. For example, the unit region (310) may be a square area. The area (that is, the surface area encompassing the three-dimensional structure of the upper side) of the surface (shaded area) of the upper side of the unit region may be 1.2 times or more, specifically, 1.2 times to 5 times, or 1.5 to 3 times, of the area calculated as the square of the length (m) of the side thereof.

As an example, when the magnetic pad is divided into square unit regions having a side of 1 cm in the horizontal direction, the surface area of one side (i.e., upper side or lower side) of at least one of the unit regions may have a surface area of 1.2 cm² or more. As another example, when the magnetic pad is divided into square unit regions having a side of 2 cm in the horizontal direction, the surface area of one side of at least one of the unit regions may have a surface area of 2.4 cm² or more or 4.8 cm² or more. As still another example, when the magnetic pad is divided into square unit regions having a side of 3 cm in the horizontal direction, the surface area of one side of at least one of the unit regions may have a surface area of 3.6 cm² or more, 7.2 cm² or more, or 10.8 cm² or more.

Figure 4:
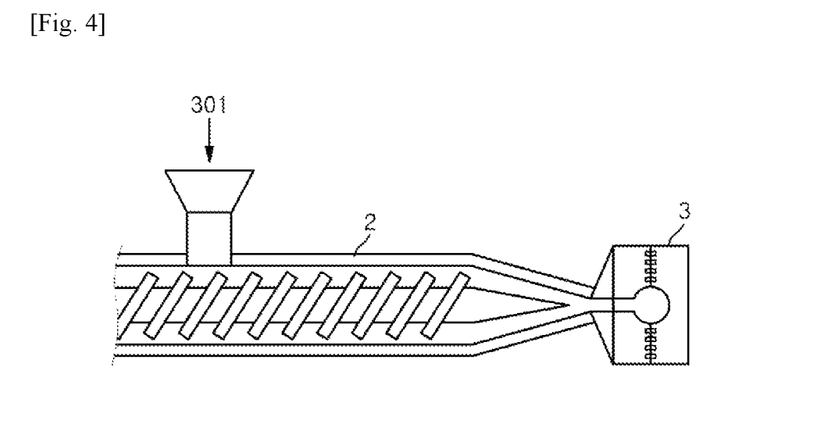
FIG. 4 illustrates a process of forming a magnetic pad through a mold.

As described above, the magnetic pad may be molded to have a three-dimensional structure. For example, the magnetic pad may be one molded through a mold. Specifically, the molding may be carried out by injecting the raw materials for the magnetic pad into a mold by injection molding. More specifically, the magnetic pad may be prepared by mixing a magnetic powder and a polymer resin composition to obtain a raw material composition, and then injecting the raw material composition (301) into a mold (3) by an injection molding machine (2) as shown in FIG. 4. In such an event, the internal shape of the mold (3) may be designed as a three-dimensional structure, so that the three-dimensional structure of the magnetic pad may be easily achieved. It is impossible that such a process is carried out in the case where a conventional sintered ferrite sheet is used as a magnetic pad.

Magnetic Characteristics of the Magnetic Pad

The magnetic pad may have magnetic characteristics of a certain level in the vicinity of a standard frequency for wireless charging of an electric vehicle.

The standard frequency for wireless charging of an electric vehicle may be less than 100 kHz, for example, 79 kHz to 90 kHz, specifically, 81 kHz to 90 kHz, more specifically, about 85 kHz. It is a band distinct from the frequency applied to mobile electronic devices such as cell phones.

The magnetic permeability of the magnetic pad in a frequency band of 85 kHz may vary depending on the material. It may be in the range of 5 to 150,000 and may specifically be in the range of 5 to 300, 500 to 3,500, or 10,000 to 150,000, depending on the specific material. In addition, the magnetic permeability loss of the magnetic pad in a frequency band of 85 kHz may vary depending on the material. It may be in the range of 0 to 50,000 and may specifically be 0 to 1,000, 1 to 100, 100 to 1,000, or 5,000 to 50,000, depending on the specific material.

As a specific example, when the magnetic pad is a polymer-type magnetic block comprising a magnetic powder and a binder resin, its magnetic permeability may be, for example, 5 to 130, 15 to 80, or 10 to 50, and its magnetic permeability loss may be 0 to 20, 0 to 15, or 0 to 5, in a frequency band of 85 kHz.

Characteristics of the Magnetic Pad

The magnetic pad may be elongated at a certain ratio. For example, the elongation of the magnetic pad may be 0.5% or more. The elongation characteristic is difficult to obtain in a ceramic-based magnetic pad to which a polymer is not applied. It may reduce damage even if a large-area magnetic pad is distorted by an impact. Specifically, the elongation of the magnetic pad may be 0.5% or more, 1% or more, or 2.5% or more. There is no particular limitation to the upper limit of the elongation. However, if the content of the polymer resin is increased to enhance the elongation, such characteristics of the magnetic pad as inductance may be deteriorated. Thus, the elongation is preferably 10% or less.

The magnetic pad has a small rate of change in characteristics before and after an impact and is significantly superior to those of conventional ferrite magnetic sheets.

In the present specification, the rate of change (%) in certain characteristics before and after an impact may be calculated by the following equation.

Rate of change (%) in characteristic=|characteristic value before impact−characteristic value after impact|/characteristic value before impact×100

For example, when the magnetic pad is subjected to free-falling from a height of 1 m, it may have a rate of change in inductance of less than 5% or 3% or less before and after the impact. More specifically, the rate of change in inductance may be 0% to 3%, 0.001% to 2%, or 0.01% to 1.5%. Within the above range, since the rate of change in inductance before and after an impact is relatively small, the stability of the magnetic pad may be further enhanced.

In addition, when the magnetic pad is subjected to free-falling from a height of 1 m, it may have a rate of change in Q factor of 0% to 5%, 0.001% to 4%, or 0.01% to 2.5%, before and after the impact. Within the above range, since the change in characteristics before and after an impact is small, the stability and impact resistance of the magnetic pad may be further enhanced.

In addition, when the magnetic pad is subjected to free-falling from a height of 1 m, it may have a rate of change in resistance of 0% to 2.8%, 0.001% to 1.8%, or 0.1% to 1.0%, before and after the impact. Within the above range, even if it is repeatedly applied in an environment where an actual impact and vibration are applied, the resistance value can be well maintained below a certain level.

In addition, when the magnetic pad is subjected to free-falling from a height of 1 m, it may have a rate of change in charging efficiency of 0% to 6.8%, 0.001% to 5.8%, or 0.01% to 3.4%, before and after the impact. Within the above range, even if a large-area magnetic pad is repeatedly subjected to an impact or distortion, its characteristics can be more stably maintained.

Housing

The wireless charging device according to an embodiment may further comprise a housing for accommodating the components described above.

The housing allows such components as the coil, the shield unit, and the magnetic pad to be properly disposed and assembled. The material and structure of the housing may be a material and structure of a conventional housing used in a wireless charging device. It may be appropriately designed according to the components adopted therein.

Figure 5A:
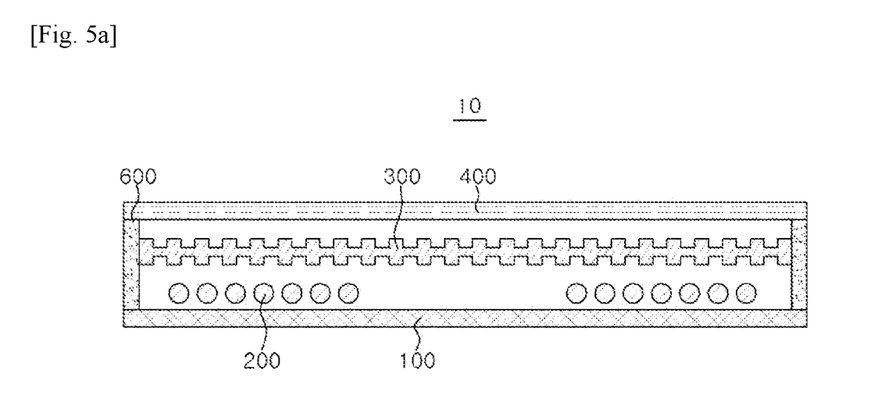
FIGS. 5a and 5b are each a cross-sectional view of a wireless charging device according to an embodiment.
Figure 5B:
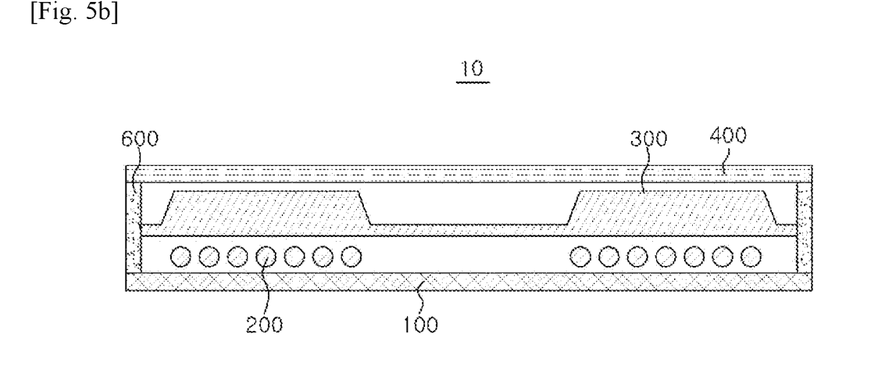

Referring to FIGS. 5a and 5b, the wireless charging device (10) according to an embodiment comprises a housing (600); a coil (200) disposed in the housing (600) and comprising a conductive wire; a shield unit (400) disposed on the coil (200); and a magnetic pad (300) disposed between the coil (200) and the shield unit (400), wherein the magnetic pad satisfies the above Relationship (1).

Support Unit

The wireless charging device (10) may further comprise a support unit (100) for supporting the coil. The material and structure of the support unit may be a material and structure of a conventional support unit used in a wireless charging device. The support unit may have a flat plate structure or a structure in which a groove is formed in compliance with a coil shape to fix the coil.

Spacer

In addition, the wireless charging device according to an embodiment may further comprise a spacer for securing a space between the shield unit and the magnetic pad. The material and structure of the spacer may be a material and structure of a conventional spacer used in a wireless charging device.

Transportation Means

Figure 7:
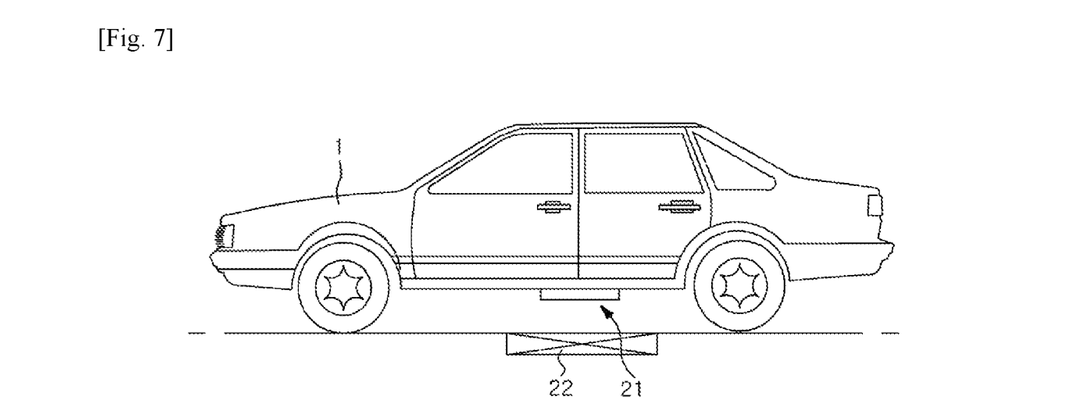
FIG. 7 shows a transportation means provided with a wireless charging device.

FIG. 7 shows an electric vehicle, specifically, an electric vehicle provided with a wireless charging device. Since it is provided with a wireless charging device on its lower side, it may be charged wirelessly in a parking area equipped with a wireless charging system for an electric vehicle.

Referring to FIG. 7, the transportation means (1) according to an embodiment comprises a wireless charging device according to the embodiment as a receiver (21). The wireless charging device may serve as a receiver for wireless charging of the transportation means (1) and may receive power from a transmitter (22) for wireless charging.

Specifically, the transportation means comprises a wireless charging device, wherein the wireless charging device comprises a coil comprising a conductive wire; a shield unit disposed on the coil; and a magnetic pad disposed between the coil and the shield unit, wherein the magnetic pad satisfies the above Relationship (1).

The configuration and characteristics of each component of the wireless charging device adopted in the transportation means are as described above.

The transportation means may further comprise a battery for receiving power from the wireless charging device. The wireless charging device may receive power wirelessly and transmit it to the battery, and the battery may supply power to a driving system of the transportation means. The battery may be charged by power transmitted from the wireless charging device or other additional wired charging devices.

In addition, the transportation means may further comprise a signal transmitter for transmitting information about the charging to the transmitter of the wireless charging system. The information about such charging may be charging efficiency such as charging speed, charging extent, and the like.

The invention claimed is:

1. A wireless charging device, which comprises a coil comprising a conductive wire; a shield unit disposed on the coil; and a magnetic pad disposed between the coil and the shield unit, wherein the magnetic pad satisfies the following Relationship (1):

$$S_{TOT}/C_{MAX} \geq 2.5 \quad (1)$$

in the above relationship, $C_{MAX}$ is the maximum cross-sectional area among cross-sectional areas that can be derived when the magnetic pad is cut in the horizontal direction, and $S_{TOT}$ is the total surface area of the magnetic pad.

2. The wireless charging device of claim 1, wherein the magnetic pad further satisfies the following Relationship (2):

$$(S_{top}+S_{bottom})/C_{MAX} \geq 2.2 \quad (2)$$

in the above relationship, $C_{MAX}$ is the maximum cross-sectional area among cross-sectional areas that can be derived when the magnetic pad is cut in the horizontal direction, and $S_{top}$ and $S_{bottom}$ are each the surface area of the upper side and lower side of the magnetic pad.

3. The wireless charging device of claim 1, wherein when the magnetic pad is divided into square unit regions having a side of 1 cm in the horizontal direction, the surface area of one side of at least unit region has a surface area of 1.2 cm$^2$ or more.

4. The wireless charging device of claim 1, wherein the magnetic pad is provided with a plurality of protrusions on at least one side thereof, and the surface area of the side having the plurality of protrusions is 1.2 times or more of $C_{MAX}$.

5. The wireless charging device of claim 1, wherein the magnetic pad has a shape in which the size in the vertical direction is smaller than the size in the horizontal direction.

6. The wireless charging device of claim 1, wherein the magnetic pad comprises a binder resin and a magnetic powder dispersed in the binder resin.

7. The wireless charging device of claim 1, wherein the magnetic pad is molded to have a three-dimensional structure.

8. The wireless charging device of claim 7, wherein the magnetic pad is one molded through a mold.

9. A transportation means, which comprises a wireless charging device, wherein the wireless charging device comprises a coil comprising a conductive wire; a shield unit disposed on the coil; and a magnetic pad disposed between the coil and the shield unit, and wherein the magnetic pad satisfies the following Relationship (1):

$$S_{TOT}/C_{MAX} \geq 2.5 \quad (1)$$

in the above relationship, $C_{MAX}$ is the maximum cross-sectional area among cross-sectional areas that can be derived when the magnetic pad is cut in the horizontal direction, and $S_{TOT}$ is the total surface area of the magnetic pad.

10. The transportation means of claim 9, wherein the transportation means is an electric vehicle.

* * * * *